US012619555B2

(12) United States Patent
Anquet et al.

(10) Patent No.: US 12,619,555 B2
(45) Date of Patent: May 5, 2026

(54) CIRCUIT AND METHOD FOR INTERFACING WITH PERIPHERAL CIRCUITS

(71) Applicant: STMicroelectronics International N.V., Geneva (CH)

(72) Inventors: Nicolas Anquet, Grenoble (FR); Gilles Pelissier, Champagnier (FR)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/617,982

(22) Filed: Mar. 27, 2024

(65) Prior Publication Data

US 2026/0037452 A1 Feb. 5, 2026

(30) Foreign Application Priority Data

Mar. 31, 2023 (FR) ....................................... 2303154

(51) Int. Cl.
*G06F 12/14* (2006.01)

(52) U.S. Cl.
CPC ...... *G06F 12/1458* (2013.01); *G06F 12/1408* (2013.01); *G06F 12/1441* (2013.01)

(58) Field of Classification Search
None
See application file for complete search history.

(56) References Cited

U.S. PATENT DOCUMENTS 6,708,273 B1 * 3/2004 Ober ........................ G06F 21/79
713/192
8,180,928 B2 5/2012 Elzur et al.

| | | | |
|---|---|---|---|
| 8,832,460 | B2 | 9/2014 | Lizuka et al. |
| 8,904,076 | B2 | 12/2014 | Fernald |
| 9,384,086 | B1 | 7/2016 | Craddock et al. |
| 10,366,024 | B2 | 7/2019 | Craddock et al. |
| 11,468,119 | B2 | 10/2022 | Lee |
| 11,593,195 | B2 | 2/2023 | Brandon et al. |
| 11,669,625 | B2 | 6/2023 | Durham et al. |
| 12,117,949 | B2 | 10/2024 | Nandlinger et al. |
| 2010/0071055 | A1 | 3/2010 | Kaniz et al. |
| 2012/0008768 | A1 | 1/2012 | Mundra et al. |

(Continued)

FOREIGN PATENT DOCUMENTS

| | | |
|---|---|---|
| EP | 1870814 A1 | 12/2007 |
| EP | 2437198 A1 | 4/2012 |

(Continued)

OTHER PUBLICATIONS

INPI Search Report and Written Opinion for priority application, FR 2303154, report dated Nov. 15, 2023, 12 pgs.

(Continued)

*Primary Examiner* — Brandon Hoffman

(74) *Attorney, Agent, or Firm* — Crowe & Dunlevy LLC

(57) ABSTRACT

An interface circuit is coupled to first and second peripheral circuits. A register of the interface circuit stores a state parameter. The interface circuit is configured to: receive a write or read access request originating from a processor and directed towards a destination address in the first peripheral circuit; and generate a write and/or read operation at the first and/or the second peripheral circuit, the operation and its destination being selected according to the state value and the destination address.

28 Claims, 8 Drawing Sheets

(56)     References Cited

U.S. PATENT DOCUMENTS

| | | |
|---|---|---|
| 2014/0229739 A1 | 8/2014 | Roth et al. |
| 2016/0007071 A1 | 1/2016 | Burckard |
| 2019/0245686 A1 | 8/2019 | Rahimi et al. |
| 2019/0319781 A1 | 10/2019 | Chhabra et al. |
| 2020/0403779 A1 | 12/2020 | Gopal et al. |
| 2022/0262448 A1 | 8/2022 | Kim et al. |
| 2023/0317137 A1 | 10/2023 | Li et al. |
| 2023/0342044 A1 | 10/2023 | Hong et al. |
| 2024/0078151 A1 | 3/2024 | Chao et al. |
| 2024/0256390 A1 | 8/2024 | Imtiaz et al. |

FOREIGN PATENT DOCUMENTS

| | | | |
|---|---|---|---|
| WO | 0117163 | A1 | 3/2001 |
| WO | 2020190776 | A1 | 9/2020 |

OTHER PUBLICATIONS

EPO Search Report and Written Opinion for counterpart EP Appl. No. 24164625.6, report dated Jun. 19, 2024, 13 pgs.

* cited by examiner

| OP STEP 700 | MODE IN PKA 702 | GCMPH IN AES 704 | OPERATION 706 | END 708 | CPU ACTION 710 |
|---|---|---|---|---|---|
| 0x6 | 0x24 | | RNG → PKA | RNGOKF SET | WRITE IN PKA |
| 0x4 | | 0x2 | N/A | DATAOKF SET | WRITE IN PKA |
| 0x8 | 0x24 | 0x3 | PKA → AES | GCMPH=0x3 | READ/WRITE IN PKA |
| 0xA | | | N/A | IPRST | READ IN AES |
| 0x0 | N/A | N/A | N/A | N/A | RESET |

Fig 7

CIRCUIT AND METHOD FOR INTERFACING WITH PERIPHERAL CIRCUITS

PRIORITY CLAIM

This application claims the priority benefit of French Application for Patent No. 2303154, filed on Mar. 31, 2023, the content of which is hereby incorporated by reference in its entirety to the maximum extent allowable by law.

TECHNICAL FIELD

The present disclosure generally concerns circuits and methods for interfacing with peripheral circuits.

BACKGROUND

Certain generic processors contained in electronic devices are required to interact with peripheral circuits. In certain cases, these peripheral circuits may ensure functions linked to security, such as cryptographic operations, for example including operations of encryption, signature and/or hash value generation, etc.

A problem with interactions between the generic processor and peripheral circuits is the high demand imposed to the generic processor in terms of processing of communications with the peripheral circuits.

Further, the generic processor may be required to manipulate secrets of the device, such as for example encryption keys. These secrets are, for example, manipulated by the generic processor during the execution of the cryptographic operations. However, it is desirable for software, executed by the generic processor, not to have access to these secrets.

There thus exists a need for a solution to improve interactions between a generic processor and peripheral circuits.

SUMMARY

An embodiment provides an interface circuit coupled to at least a first peripheral circuit and a second peripheral circuit, and comprising a register storing a state parameter, the interface circuit being configured to: receive a read or write access request, originating from a processor and directed towards a destination address in the first peripheral circuit; and generate a write and/or read access operation at the first and/or the second peripheral circuit, the access operation and its destination being selected according to the state value and to the destination address.

According to an embodiment, when the access request is an access request for the writing of data, the interface circuit is further configured to further select the access operation and/or its destination according to the data value.

According to an embodiment, when the access request is an access request for the writing of a first data value or of a second data value, different from the first data value, into the first peripheral circuit and when the state parameter is programmed to a first state value, the generated access operation comprises the writing of another data value, generated by the second peripheral circuit, at the destination address in the first peripheral circuit.

According to an embodiment, when the state parameter is programmed to a second state value, different from the first state value, the access operation comprises the reading from the first peripheral circuit of a data value stored at the destination address and the writing of the data value into the second peripheral circuit.

According to an embodiment, the above circuit is further configured to, when the state parameter is programmed to a set value, authorize the access operation, by the processor, to each of the first and second peripheral circuits.

According to an embodiment, when the access request is an access request for writing a forbidden data value, the generated access operation comprises the programming of the value of the state parameter to the set value and the removal of the content of at least one of the first and second peripheral circuits.

According to an embodiment, the generated access operation further comprises the reading from and/or the writing into a third peripheral circuit coupled to the interface circuit.

According to an embodiment, the above circuit is further configured to, as a response to the read or write access request originating from the processor, return a default value to the processor.

An embodiment provides an electronic device comprising: the above interface circuit; and the first and second peripheral circuits coupled to the interface circuit; and the processor coupled to the interface circuit and configured to transmit a read or write access request to a destination address in one among the first and second peripheral circuits.

According to an embodiment, the first and second peripheral circuits comprise a first cryptographic circuit and a number generator, and the interface circuit is configured to, when the state parameter is programmed to a first state value, intercept an access request for the writing of an encryption key originating from the processor and towards a destination address in the first cryptographic circuit and control the writing of another value, generated by the number generator, at the destination address in the first cryptographic circuit.

According to an embodiment, the circuit further comprises a second cryptographic circuit, and the interface circuit is configured to, when the state parameter is programmed to a second state value different from the first state value, intercept a write and/or read access request originating from the processor and towards a destination address in the first cryptographic circuit and control the writing of a data value, previously stored at the destination address in the first cryptographic circuit, into the second cryptographic circuit.

According to an embodiment, the above circuit further comprises a clock reset circuit configured to activate and/or deactivate the first and second peripheral circuits and the interface circuit is configured to control the clock reset circuit.

An embodiment provides a method comprising: receiving, by an interface circuit, a write or read access request, originating from a processor and towards a destination address in a first peripheral circuit coupled to the interface circuit; generating, by the interface circuit, a write and/or read operation towards the first peripheral circuit and/or a second peripheral circuit coupled to the interface circuit, the access operation and its destination being selected according to the value of a state parameter, stored in a register of the interface circuit, and to the destination address.

According to an embodiment, when the access request is an access request for the writing of data, the generated access operation and/or its destination are further selected according to the data value.

According to an embodiment, the above method further comprises delivering, by the interface circuit and towards the processor, a default value as a response to the read or write access request.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which:

FIG. 7 is a table showing examples of different operations performed by the coupling and chaining circuit according to a state value.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, the cryptographic algorithms, such as algorithms of Asymmetric Encryption Standard (AES) type, as well as key derivation algorithms, are not described in detail and are known by those skilled in the art.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

Figure 1:
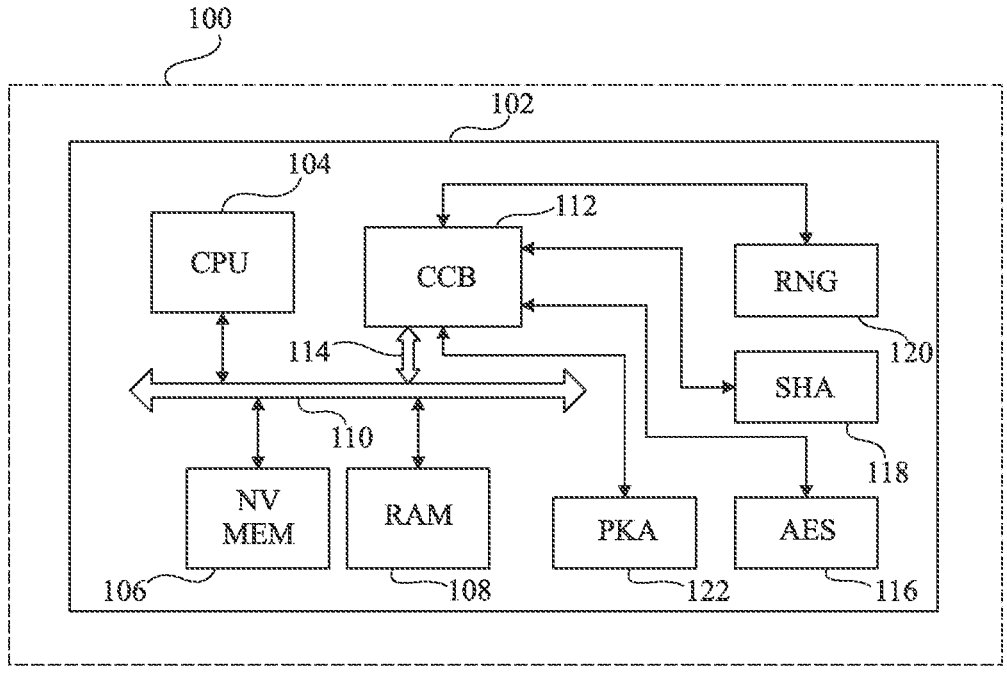
FIG. 1 is a block diagram of an electronic device comprising a coupling and chaining circuit according to an embodiment of the present disclosure.

FIG. 1 is a block diagram of an electronic device 100 comprising an integrated circuit 102 according to an embodiment of the present disclosure.

Electronic device 100 is, for example, a mobile electronic device, such as a cell phone, or an electronic card such as a microcircuit card.

Circuit 102 comprises, for example, a processor 104 (CPU) coupled to a non-volatile memory 106 (NV MEM) and to a volatile memory 108 (RAM) via a system bus 110. As an example, memory 106 is a Flash-type memory, and memory 108 is a Random Access Memory (RAM) type memory.

According to an embodiment, circuit 102 further comprises an interface circuit 112 (Coupling and Chaining Bridge (CCB)) coupled to bus 110 via a bus 114. The term "coupling" refers to one or a plurality of transactions carried out in parallel by two peripheral circuits while the term "chaining" refers to one or a plurality of transactions carried out in series by two peripheral circuits. In other words, in a chaining operation, the two implied peripheral circuits are busy one after the other. The interface circuit is, for example, configured to provide a link between bus 114 and peripheral circuits. Interface circuit 112 will here also be called "coupling and chaining circuit", since it is capable of carrying out coupling and/or chaining functions in relation with the peripheral circuits. Bus 114 is for example a bus of Advanced High-performance Bus (AHB) type. In other examples, bus 114 is a bus of Advanced Peripheral Bus (APB) or Advanced External Interface (AXI) type.

Circuit 102 comprises, for example, peripheral circuits 116, 118, 120, and/or 122.

Circuit 116 (AES) is, for example, a cryptographic circuit. Cryptographic circuit 116 is, for example, configured to encrypt and/or decrypt data according to a symmetric encryption algorithm, such as for example an algorithm of Advanced Encryption Standard (AES) type.

Circuit 118 (SHA) is, for example, another cryptographic circuit. As an example, circuit 118 is a circuit configured to perform hash operations, for example according to an algorithm of Secure Digest Algorithm (SHA) type. As an example, cryptographic circuit 118 is further configured to perform cryptographic operations, such as for example generations of symmetrical keys and/or key derivation functions and/or shared key computing, for example used for Elliptic Curve Diffie Hellman (ECDH) encryption and decryption. In another example, cryptographic circuit 118 is configured to generate signatures of SHA1, SHA2, and/or SHA3 type or hashed message authentication codes (hashed MAC (HMAC)).

Circuit 120 (RNG) is, for example, a true random number generator (TRNG) using a physical random source based, for example, on intrinsic properties of the material on which it is implanted. In another example, the number generator is a pseudo-random number generator, for example a linear congruential generator.

In another example, number generator 120 is implemented in software fashion, for example software stored and executed in coupling and chaining circuit 112 in the case where the latter comprises an adapted processor and memory. In this example, circuit 102 is configured so that processor 104 does not have access to the values generated by number generator 120 for a peripheral circuit among circuits 116, 118, or 122.

Circuit 122 (PKA) is, for example, a key accelerator. As an example, circuit 122 is configured to perform pre-computing operations on a private or public key before it is, for example, processed by cryptographic circuit 116 or by cryptographic circuit 118.

Processor 104 is, for example, a generic and non-secure processor. Thus, when critical data of circuit 102, such as encryption keys stored in non-volatile memory 106, are manipulated by processor 104, their integrity is not guaranteed.

According to an embodiment, cryptographic circuits 116 and 118 and circuit 122 are each coupled, via a dedicated bus, to coupling and chaining circuit 112. In the example where number generator 120 is a hardware circuit, the latter is also coupled, for example, to the coupling and chaining circuit 112 via a dedicated bus. Coupling and chaining circuit 112 is configured to perform chaining operations on data exchanged between circuits 116 to 122.

As an example, other peripheral circuits, for example other cryptographic circuits, are also coupled to coupling and chaining circuit 112 and in other embodiments, one or a plurality of circuits 116, 118, 120, and/or 122 could be omitted.

Figure 2:
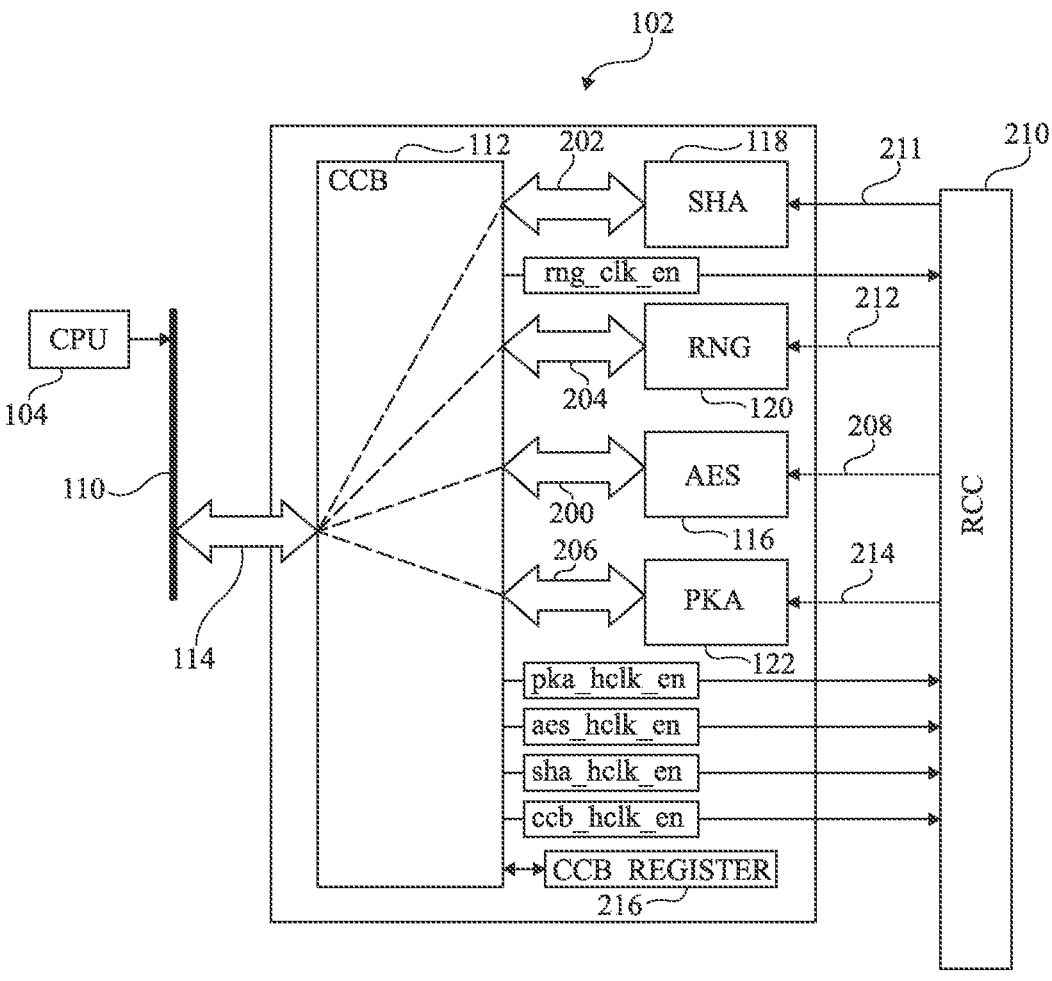
FIG. 2 illustrates in further detail a circuit of the electronic device according to an embodiment of the present disclosure.

FIG. 2 illustrates in further detail circuit 102 according to an embodiment of the present disclosure.

Circuits 116, 118, 120, and 122 are, for example, each respectively coupled to coupling and chaining circuit 112 via a bus 200, 202, 204, and 206. As an example, buses 110, 114, and 200 to 206 are AHB-type buses. In other examples, buses 110, 114, and 200 to 206 are APB-type or AXI-type buses. Still in another example, buses 110, 114, and 200 to 206 are proprietary buses.

As an example, coupling and chaining circuit 112 is coupled to other peripheral circuits (not illustrated) via dedicated buses. For example, coupling and chaining circuit 112 is coupled to a cyclic redundancy check circuit configured to generate error verification codes based on data values.

As an example, circuit 102 further comprises a clock reset and control circuit 210 (RCC). As an example, circuit 210 is configured to control the rating of circuit 116, respectively 118, 120, and 122, via clock bus 208, respectively 211, 212, and 214.

As an example, coupling and chaining circuit 112 is further configured to control the activation of one or of a plurality of peripheral circuits 116, 118, and/or 122 via clock reset circuit 210. As an example, coupling and chaining circuit 112 transmits one or a plurality of activation signals aes_hclk_en, sha_hclk_en, pka_hclk_en, ccb_hclk_en, and/or rng_hclk_en to clock reset circuit 210 so as to force clock reset circuit 210 to rate circuits 116, 118, 122, 112, and/or 120. When clock reset circuit 210 is forced to rate circuits 116, 118, and/or 122, it is no longer possible to deactivate the rating by software means, for example by programming in registers of circuit 210. By means of activation signals aes_hclk_en, sha_hclk_en, and/or pka_hclk_en, coupling and chaining circuit 112 is thus capable of activating the one or a plurality of circuits 116, 118, 120, and 122.

Coupling and chaining circuit 112 is configured to performed read and/or write operations between peripheral circuits 116, 118, 120, and/or 122 as a response to the reception of an access request, towards one of peripheral circuits 116, 118, 120, and/or 122 and from processor 104.

As an example, coupling and chaining circuit 112 comprises a register 216 (CCB REGISTER) configured to store a state parameter. As an example, the state value conditions the behavior of the coupling and chaining circuit. As an example, for two different values of the state parameter, the implied peripheral circuits, and/or the type of operations performed, differ. The state value is, for example, programmed by coupling and chaining circuit 112, and in particular by a state machine formed by coupling and chaining circuit 112. The value of the state parameter written into register 216 imposes a type of operation, for example a read and/or write operation, in circuit 122. The value of the state parameter further imposes, for example, a series of states in the state machines, each state of the state machine being associated with one or a plurality of chaining and/or coupling operations between at least two peripheral circuits. More particularly, a configuration value is, for example, stored in a register of the state machine. This value corresponds, for example, to a configuration of coupling and chaining circuit 112, and for each configuration value, the value of the state parameter indicates to coupling and chaining circuit 112 an operation to be performed. Thus, according to the configuration value, a same value of the state parameter signifies, for example, two different transactions. Thus, the possible sequences of the values taken by the state parameter differ according to the value of the configuration parameter.

Figure 3:
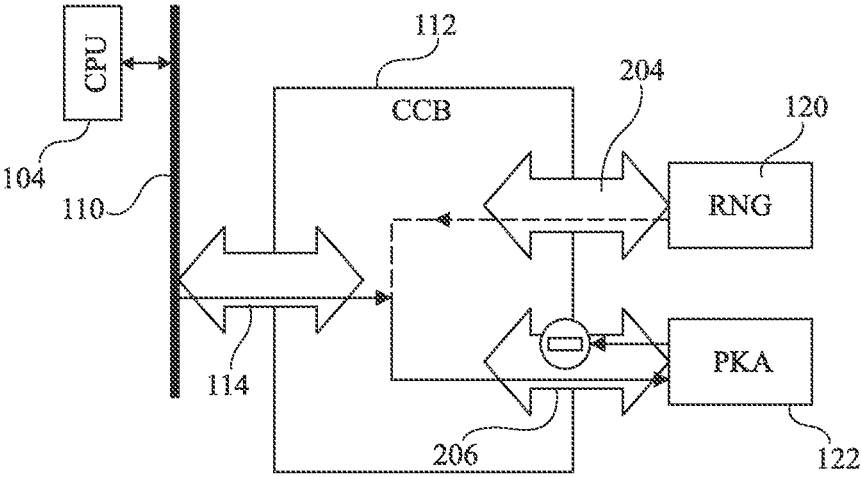
FIG. 3 is a block diagram illustrating an example of an operation implemented by the coupling and chaining circuit.

FIG. 3 is a block diagram illustrating an example of operation implemented by coupling and chaining circuit 112, between circuits 120 and 122.

As an example, FIG. 3 illustrates a chaining operation, implemented by coupling and chaining circuit 112. This operation is, for example, performed for a first configuration value of the state machine. In particular, during the implementation of the described operation, the value of the state parameter varies. As an example, the value of the state parameter is incremented after each transaction between two circuits.

In the example illustrated in FIG. 3, processor 104 transmits data for writing a private key, or more generally a data value, to a destination address in circuit 122.

According to an embodiment, coupling and chaining circuit 112 is configured to intercept the data value, transmitted via bus 114. Coupling and chaining circuit 112 is further configured to, on reception of the write access request, control the generation of a value by number generator 120. As an example, before, or directly after, the transmission of the data value to be written by the processor, it is verified that a random value is available in number generator circuit 120. As an example, if no data is available in number generator circuit 120, an error signal is generated. As an example, as a result of the generation of the error signal, all the data stored in circuits 116, 118, and 122 are erased. Further, as an example, as a result of the error signal generation, the write access request is abandoned. In another example, for one or a plurality of given configuration values, processor 104 is authorized to write a value, known by processor 104, into circuit 122.

Coupling and chaining circuit 112 is then configured to generate a new write request towards circuit 122 on reception of a write access request, in a volatile memory of circuit 122, originating from processor 104. The writing into circuit 122 controlled by coupling and chaining circuit 122 is, for example, performed at the destination address indicated in the write access request by processor 104.

As an example, whatever the value of the key, or more generally of the data, transmitted by processor 104, a value generated by number generator 120 is written at the desired destination address in circuit 122.

According to an embodiment, coupling and chaining circuit 112 is further configured to forbid the reading from circuit 122 to processor 104. As an example, coupling and chaining circuit 112 is configured to return to processor 104 a default value as a response to an access request, originating from processor 104, for reading from and/or writing into circuit 122. Thus, the value stored in a volatile memory of circuit 122, at the location of the data value transmitted by processor 104, is inaccessible by processor 104.

Figure 4A:
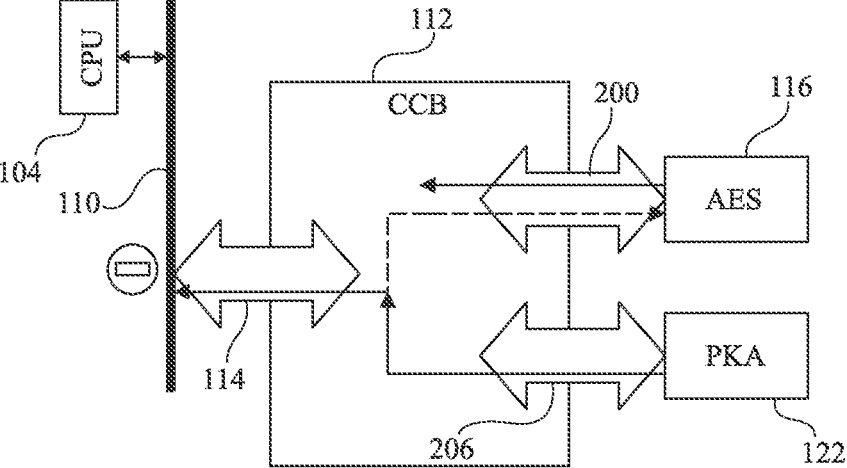
FIG. 4A is a block diagram illustrating an example of an operation implemented by the coupling and chaining circuit.

FIG. 4A is a block diagram illustrating an example of operation implemented by coupling and chaining circuit 112 between circuits 122 and 116. More particularly, FIG. 4A illustrates an operation of chaining of circuit 122 towards cryptographic circuit 116.

As an example, FIG. 4A illustrates a chaining operation, implemented by coupling and chaining circuit 112. This operation is, for example, performed for a second configuration value of the state machine. In particular, during the performing of the described operation, the value of the state parameter varies. As an example, the value of the state parameter is incremented after each transaction between two circuits.

In the example illustrated in FIG. 4A, processor 104 wants to access circuit 122. Processor 104 transmits, for example, an access request for the writing of data stored at a destination address in circuit 122.

According to an embodiment, coupling and chaining circuit 112 is configured to deliver a default value to processor 104 as a response to a write access request, originating from processor 104. As an example, the default value comprises indicating to the processor that the writing has been performed, for example by returning a write done value. Coupling and chaining circuit 112 is further configured to, as a response to the request to access the destination address in circuit 122, generate an access request for the writing of the data value stored at the destination address in circuit 122, towards cryptographic circuit 116. Coupling and chaining circuit 112 is further configured, for example, to transform the write request of processor 104 into a request for reading from the address given by processor 104 in the volatile memory of circuit 122 by using a dedicated bus. The value recovered from the volatile memory of circuit 122 is then written, by coupling and chaining circuit 112, into circuit 116 at a fixed address which corresponds, for example, to the input of a memory of FIFO ("First Input First Output") type. In the case where a problem is detected, such as a writing in a wrong format, for example a writing of 1 byte or 2 bytes instead of a writing of 4 bytes, an error is returned to processor 104 as a response to the write request.

Cryptographic circuit 116 is then configured to encrypt the data value, for example according to an AES encryption algorithm. As an example, the encrypted value is accessible by processor 104.

The value of the data transmitted by processor 104 is, for example, a parameter additional to the performed operation. As an example, the data value indicates an address in circuit 116 at which the data, stored at the destination address in circuit 122, is to be written.

In another example, coupling and chaining circuit 112 is configured to perform the operation described in relation with FIG. 4A only when the data value transmitted by processor 104 is equal to a value defined upstream, such as, for example, a value called magic. As an example, on reception of an access request for the writing of a data value, coupling and chaining circuit 112 is configured to compare the data value with a value stored, for example, in a register of coupling and chaining circuit 112. As an example, the comparison is performed by a state machine. As an example, in the case where the two values differ, coupling and chaining circuit 112 is configured to, for example perform an operation such as the writing of 0 into the volatile memory of circuit 122. The writing of 0, by processor 104, causes, for example, the stopping of the chaining operations, indicates to circuit 122 the end of the transfer and allows the passage to the next configuration value for the state machine.

Figure 4B:
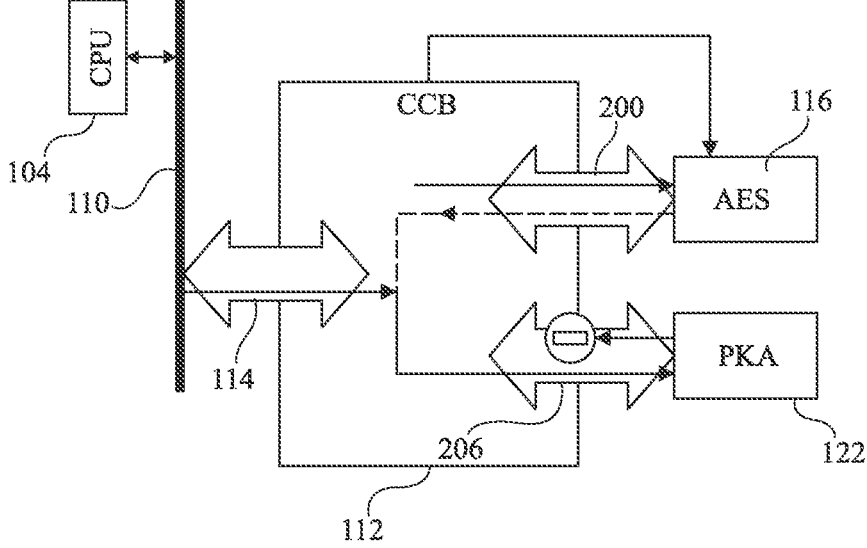
FIG. 4B is a block diagram illustrating an example of another operation implemented by the coupling and chaining circuit.

FIG. 4B is a block diagram illustrating an example of operation implemented by coupling and chaining circuit 112 between circuits 122 and 116. More particularly, FIG. 4B illustrates an operation of chaining of circuit 116 towards cryptographic circuit 122. This operation is for example performed by a third configuration value of the state machine. In particular, during the implementation of the described operation, the value of the state parameter varies. As an example, the value of the state parameter is incremented after each transaction between two circuits.

Processor 104 for example transmits a write access request towards a destination address in circuit 122. As an example, the chaining operation is performed when the data value transmitted by processor 104 is equal to a value defined upstream, for example a magic value, for example equal to 0xCCB. When the value transmitted by processor 104 is different from the magic value, coupling and chaining circuit 112 is configured to allow the writing of 0 into the volatile memory of circuit 122 and to indicate the end of the writing into the volatile memory of circuit 122 and the passage to the next configuration value for the state machine. The end of the writing into the volatile memory of circuit 122 thus causes the reprogramming of the configuration value. As an example, the comparison operation between the magic value and the data transmitted by processor 104 is carried out for a given value of the state parameter.

In another example, coupling and chaining circuit 112 is configured to, for example, control the decryption of the value stored at the destination address in circuit 116, and its writing into circuit 122. As an example, the value of the data to be written provided by processor 104 indicates an address in circuit 122 at which the decrypted value is to be written.

In an example, the value of the data to be written transmitted by processor 104 enables coupling and chaining circuit 112 to determine between which peripheral circuits the operation is to be performed.

Figure 5A:
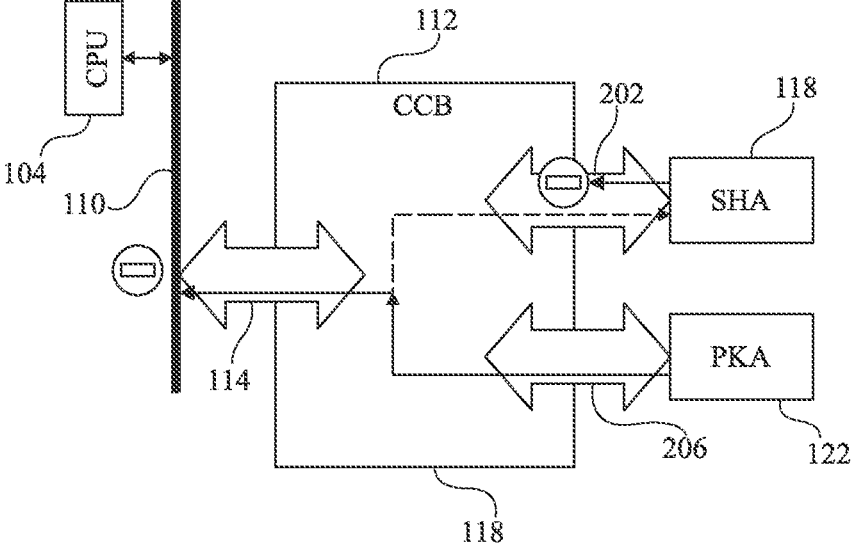
FIG. 5A is a block diagram illustrating an example of another operation implemented by the coupling and chaining circuit.

FIG. 5A is a block diagram illustrating an example of an operation implemented by coupling and chaining circuit 112. More particularly, the operation illustrated in relation with FIG. 5A is performed between circuit 122 and cryptographic circuit 118. This operation is, for example, performed for a fourth configuration value of the state machine. In particular, during the implementation of the described operation, the value of the state parameter varies. As an example, the value of the state parameter is incremented after each transaction between two circuits.

On reception of an access request for the writing of a data value, towards a destination address in circuit 122, coupling and chaining circuit 112 is, for example, configured to control the writing of the data already stored at the destination address in circuit 122 towards circuit 118.

In an example, the value of the data transmitted by processor 104 corresponds to an address in circuit 118 at which the data is to be written. In another example, the value of the data to be written provides no information and a single address in circuit 118 is accessible for writing.

In another example, the data value transmitted by processor 104 indicates, for example, between which peripheral devices the operation is to be performed.

In the example illustrated in FIG. 5A, circuit 118 is configured to perform cryptographic signature operations such as SHA2 or HMAC cryptographic operations, such as for example key derivation operations. Coupling and chaining circuit 112 is further configured to, as a response to the access request transmitted by processor 104, transmit a default value to processor 104. Processor 104 then does not have access to the values stored in circuits 118 and 122.

Figure 5B:
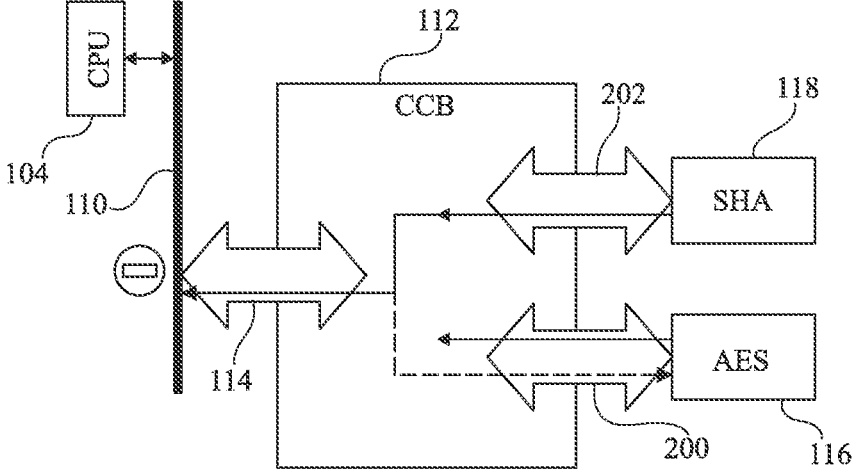
FIG. 5B is a block diagram illustrating an example of still another operation implemented by the coupling and chaining circuit.

FIG. 5B is a block diagram illustrating an example of an operation between cryptographic circuits 116 and 118, implemented by coupling and chaining circuit 112. This operation is for example performed for a fifth configuration value of the state machine. In particular, during the implementation of the described operation, the value of the state parameter varies. As an example, the value of the state parameter is incremented after each transaction between two circuits.

The programming of the configuration value to a value different from that described in relation with FIG. 4A enables, for example, the state machine to be placed in a state allowing operations of chaining of circuit 118 towards circuit 116 and no longer from circuit 122 towards circuit 118.

In another example, the operation described in relation with FIG. 5B is performed when the state parameter is programmed to the second state value. As an example, in this case, the value of the data transmitted by processor 104 enables, for example, coupling and chaining circuit 112 to distinguish whether the operation to be performed is that described in FIG. 4A or that described in relation with FIG. 5B. In other words, the value of the data to be written determines whether the operation to be performed implies circuit 122 or circuit 118.

As an example, processor 104 sends a write access request to a destination address in cryptographic circuit 118. As an example, processor 104 requests an access to the result previously generated by circuit 118 as a result of the operation described in relation with FIG. 5A.

In the example described in relation avec FIG. 5B, coupling and chaining circuit 112 is configured, for example, to intercept the write access request and to control the writing of the data, already stored at the destination address in circuit 118, into circuit 116. As an example, the data value transmitted by processor 104 corresponds to an address in circuit 116 at which the data circuit 118 is to be written.

As an example, circuit 116 is configured to encrypt the data. Processor 104 then has access, for example, to the data value encrypted by circuit 116.

According to an embodiment, coupling and chaining circuit 112 is configured to return a default value as a response to the access request originating from processor 104.

Although the operations described in relation with FIGS. 3, 4A, 4B, 5A, and 5B are performed as a response to a write access request originating from processor 104, it is quite possible to configure coupling and chaining circuit 112 so that these operations are performed as a response to read access requests. In all cases, coupling and chaining circuit 112 is configured to never authorize the access to processor 104 to data stored in one among the peripheral circuits 118, 120, and 122. As an example, only data encrypted by peripheral circuit 116 are accessible by processor 104.

Although FIGS. 3, 4A, 4B, 5A and 5B mainly describe operations in which, following a read or write request coming from the processor and to a first circuit, the coupling circuit 112 is configured to control a read operation in the first circuit or in another circuit and to control the writing in the first circuit or in the other circuit, in other embodiments, the coupling circuit only controls read operations, or write operation, to one and/or the other of the first and the other circuit. The kind of operations controlled by the coupling circuit 112 is determined by the value of the state parameter and, for example, by the type of access requested by the processor 104.

For example, the coupling and chaining circuit 112 is configured to generate, following the reception of write or read access request coming from the processor and to a destination address in the peripheral circuit, such as one of the circuits 116, 118, 120 or 122, either: a write operation of a data value, generated by another peripheral circuit, such as one of the circuits 116, 118, 120 or 122, to the destination address in the first peripheral circuit; or a read operation in the first peripheral circuit of a data value stored at the destination address and the writing of the data value in the second peripheral circuit. In particular, the kind of the operation is selected according to the value of the state parameter and the destination address, and a read or write address of the operation is for example selected on the basis of the write data value.

For example, when the state value is equal to 0xA, and when the processor 104 commands the writing of a value, for example the value 0x20000000, to an address, for example to the address 0x10000000, in a first peripheral circuit among the circuits 116, 118, 120 or 122, the coupling and chaining circuit 112 is then configured to: read the value of the data stored at address 0x20000000 in a second circuit among circuits 116, 118, 120 or 122; and write the value of this data to the address 0x10000000 in the first circuit. In this example, data is moved from address 0x20000000 of the second circuit to address 0x10000000 of the first circuit. In this way, the values of the data stored at these addresses are not known by the processor 104.

For example, when the state value is equal to 0xB, and when the processor 104 commands the writing of a value, for example the value 0x20000000, to an address, for example to the address 0x10000000, in a first peripheral circuit among the circuits 116, 118, 120 or 122, the coupling and chaining circuit 112 is then configured to: read the value of the data stored at address 0x10000000 in the first circuit; and write the value of this data to address 0x20000000 in a second peripheral circuit among circuits 116, 118, 120 or 122. In this example, the data is moved from address 0x10000000 of the first circuit to address 0x20000000 of the second circuit. In this way, the values of the data stored at these addresses are not known by the processor 104.

In these examples, the direction of the data to be written depends on the value of the state parameter. The examples above are given for illustrative purposes and are not limiting.

In other examples, the address in the second circuit is a constant when the processor 104 addresses a First-In First-Out (FIFO) type memory. In this case, the instruction for writing data, by the processor 104, is not relevant for defining the address in the second circuit.

In other cases, the instruction for writing data, by the processor 104, is used to define a new type of operation when the data is moved between two circuits among the circuits 116, 118, 120 or 122. In one example, when the data initiated by the processor is equal to a first value, for example 1, respectively equal to a second value, for example 2, the new operation is a type of byte-level data exchange, respectively at bit-level.

For example, a part of the value of the write data to be written by the processor 104 is used to define an address in the second circuit and another part of the write data is used to define the type of exchange of data.

Generally speaking, many different operations can be defined based on the combination of the state parameter, the address and the data initiated by the processor.

According to an embodiment, the coupling and chaining circuit 112 is configured to intercept a transaction, created by an initiator such as the processor 104 or a direct access circuit, to the memory, in order to create new transactions between two peripheral circuits. The nature of the new transaction depends, for example, on the value of the state parameter, the address and the initiated data.

Figure 6:
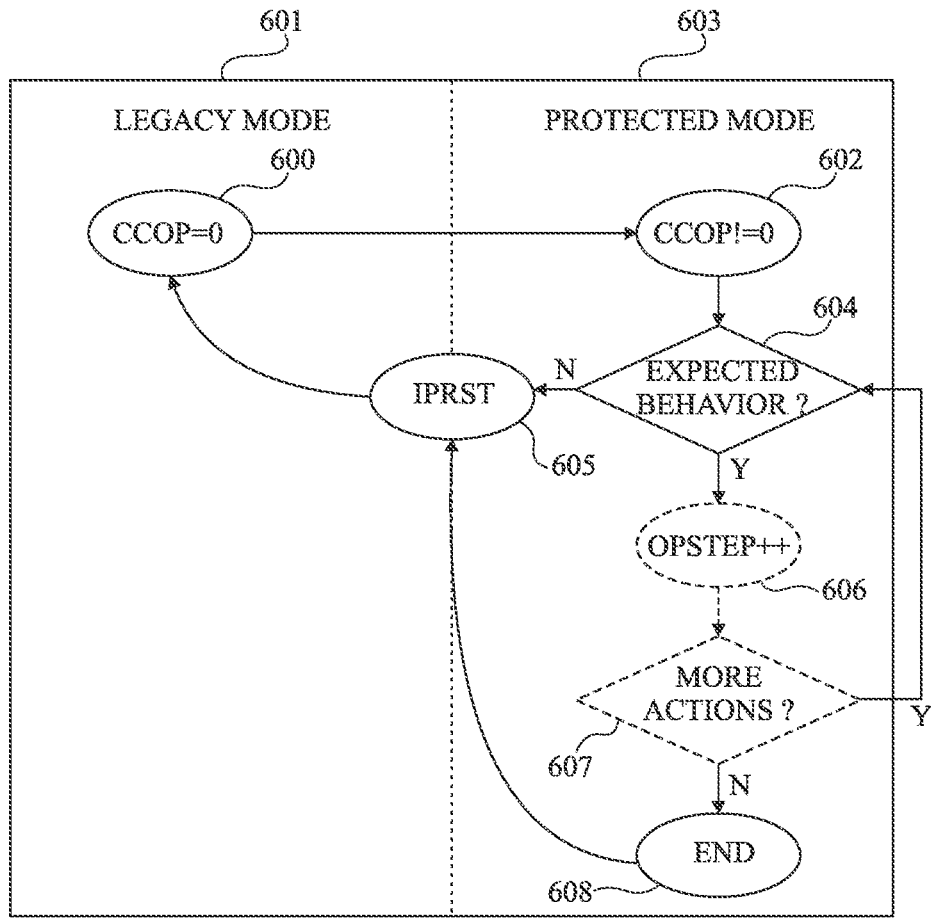
FIG. 6 is a flowchart illustrating steps carried out during different operating modes of the coupling and chaining circuit.

FIG. 6 is a flowchart illustrating steps carried out during different operating modes of coupling and chaining circuit 112.

In the rest of the disclosure, the term "suspicious event" refers to any unexpected transaction over bus 114 and/or another bus. As an example, a suspicious event occurs during a physical attack on circuit 102. Malware injected into circuit 102 may also give rise to a suspicious event. A suspicious event also occurs, for example, during a hardware attack or failure of circuit 102.

As an example, coupling and chaining circuit 112 comprises a state machine configured to detect the presence of a suspicious event towards and/or in coupling and chaining circuit 112. As an example, the state machine is configured to monitor the transactions performed over buses 114, 200, 202, 204, and 206. As an example, at each reception of an access request for the writing of a data value originating from processor 104, the state machine is configured to compare the data value with, for example, a list of authorized values. As an example, when the data value corresponds to none of the data values contained in the list, a suspicious event is detected. As an example, the list of authorized values comprises a plurality of sub-lists, each sub-list indicating authorized data values in association with a given state value.

As an example, at a step 600 (CCOP=0), the configuration value is an initial value. As an example, at each starting of circuit 102, the verification value is automatically programmed to the initial value. Coupling and chaining circuit 112 is then placed in a legacy mode 601 (LEGACY MODE). As an example, when it is placed in the legacy mode, coupling and chaining circuit 112 is configured to act as a router. In particular, the state machine is, for example, deactivated. For example, in the legacy mode, coupling and chaining circuit 112 is configured to authorize and route transactions, requested by processor 104, towards one or a plurality of peripheral circuits. In particular, when coupling and chaining circuit 112 acts as a router, the chaining or operations are, for example, not executable. On reception of a request to access a peripheral, the coupling and chaining circuit 112 then generates one or a plurality of transactions only towards the peripheral circuit in question, and not towards a plurality of peripherals.

In other examples, the legacy mode is used for test purposes. Cases of use of circuit 102 are, for example, tested via manipulations of specific data and associated with tests and manipulations of non-secret values.

As an example, the configuration value is, for example, programmed to a configuration value, different from the initial value, at a step 602 (CCOP!=0). Coupling and chaining circuit 112 is then placed in a protected mode 603 (PROTECTED MODE). As an example, in the protected mode, coupling and chaining circuit 112 is configured to, according to the value of the state parameter contained in register 216 and/or to the value of data transmitted for writing by processor 104, perform one of the operations described in relation with FIGS. 3, 4A, 4B, 5A, and/or 5B.

Step 602 further comprises, for example, access requests for the writing of keys into circuit 122. Coupling and chaining circuit 112 is then configured to perform, for each access for the writing of a key into circuit 122, the operation described in relation with FIG. 3.

Although the sequence of operations described at step 602 consists in the writing of keys, generated by number generator 120, it may quite be envisaged for other operations, for example having another aim than the writing of keys, to be performed. Those skilled in the art will be able to adapt and configure chaining and coupling circuit 112 to perform the desired operations between the desired peripheral circuits when the state parameter is programmed to the first state value.

At a step 604 (EXPECTED BEHAVIOR?), the state machine verifies that no suspicious event is occurring. As an example, step 604 is carried out in parallel with step 602. In another example, step 604 is carried out as a response to the writing of keys into circuit 12. The state machine verifies, for example, that the writing into the volatile memory of circuit 122 has occurred with no error. As an example, the state machine further verifies that the entire memory of circuit 122 has been written into.

If a suspicious event is detected (branch N at the output of block 604), the method continues at a step 605 (IPRST). As an example, step 605 comprises the reprogramming of the configuration value to the initial value, replacing coupling and chaining circuit 112 in legacy state 601. As an example, step 605 further comprises the removal of the content of the volatile memory of circuit 122. As an example, step 605 further comprises the removal of the content of the memories internal to peripheral circuits 116, 118, 120, and 122. As an example, step 605 further comprises the erasing of secret values, such as for example encryption keys, stored in different registers of peripheral circuits 122, 116, and 118.

If, during the implementation of step 604, no suspicious event is detected by the state machine (branch Y), the method continues, for example, at a step 606 (OPSTEP++). As an example, during the implementation of step 606, the state parameter is programmed, or incremented, to a new value.

Step 606 further comprises, as a response to a write, or read, access request, originating from processor 104, the execution of an operation among the operations, for example, described in relation with FIGS. 4A, 4B, 5A, and/or 5B. The nature of the operation and the concerned peripheral circuits are a function of the value of the state parameter and of the configuration value, and for example of the value of the data transmitted for writing.

After step 606, a step 607 (MORE ACTIONS?) is carried out, for example by the state machine. As an example, during step 607, the state machine determines whether other actions, for example according to the configuration value, are to be performed. If such is the case (branch Y), the method resumes in a new implementation of step 604.

As an example, the configuration value of the state machine determines the type of operation. For example, the operation described in relation with FIG. 5A is performed before the operation described in relation with FIG. 5B. For example, the performed operations are, in the order, the operation described in relation with FIG. 5A, the execution of cryptographic operations such as a hash operation by circuit 118, and the operation described in relation with FIG. 5B.

As an example, if no other action is to be performed, (branch N at the output of block 607), the method ends at a step 608 (END).

Step 608 takes place, for example, when processor 104 no longer controls any access request toward the one or a plurality of peripheral circuits 116, 118, 120, and/or 122. Step 608 then is a final step where processor 104 has access for reading to the results stored in the volatile memory of circuit 122.

After step 608, the method ends in an implementation of step 605, where the value of the state parameter is reset and the contents of the internal memories of circuits 116 to 122 are erased. Coupling and chaining circuit then is placed back into the legacy mode.

FIG. 7 is a table disclosing examples of different operations performed by coupling and chaining circuit 112 according to the value of the state parameter.

A column 700 (OPSTEP) indicates, for example, the values capable of being taken by the state parameter for a configuration value of the state machine. For example, a series of values of state parameter 0x6, 0x4, 0x8, and 0xA, represents a succession of states of the state machine for a given configuration value. Step 606 then allows the passage from one state to the next state. The state parameter is, for example, accessible by processor 104 for reading but is not accessible for writing by processor 104. Similarly, once in the protected mode, circuit 102, in particular coupling and chaining circuit 112, is configured not to authorize processor 104 to modify the configuration value and the state value. The variation of these values is, for example, internal to coupling and chaining circuit 112. The series of possible states depend, for example, on the current configuration value. Value 0x0 indicates, for example, that the configuration value is programmed to the initial value and accordingly that circuit 112 is in the legacy mode.

As an example, when the value is smaller than 0x10, a binary object is being generated. As an example, the binary object comprises an encryption, for example by circuit 116 and according to a Galois/Counter mode (GCM) of the value delivered by number generator circuit 120. The binary object enables, for example, to deliver a reference value for example enabling to verify the integrity of the data manipulated during transactions between processor 104 and circuits 122, 120, 118, and 116. The reference value is, for example, calculated according to the performed sequence of operations.

A column 702 (MODE IN PKA) indicates an operating mode of circuit 122 according to the value of the state parameter. In the example illustrated in FIG. 7, the operating mode of circuit 122 is defined by a value that may be equal to 0x24 or to N/A. As an example, in the legacy mode, circuit 122 is automatically placed in an operating mode associated with value N/A, indicating for example that circuit 122 operates normally or is inoperative. As an example, value 0x24 indicates that the access to circuit 122 is controlled by coupling and chaining circuit 112 and according to the configuration value. As an example, the value of the configuration parameter imposes the operating mode of circuit 122.

A column 704 (GCMPH IN AES) indicates an operating mode of circuit 116. As an example, when the value of column 704 is equal to 0x2, circuit 116 is configured to encrypt, according to a Galois/Counter mode, payload data. As an example, when the value of column 704 is equal to 0x3, the binary object is fully generated and the reference value can be recovered, for example by coupling and chaining circuit 112. Value N/A indicates that circuit 116 operates as expected in the legacy mode.

A column 706 (OPERATION) indicates the type of operations, for example among the operations described in relation with FIGS. 3, 4A, 4B, 5A, and/or 5B, which can be implemented, according to the value of the state parameter. As an example, in the legacy mode, coupling and chaining circuit 112 acts as a router. Thus, the operations described in relation with FIGS. 3, 4A, 4B, 5A, and 5C are not executable (N/A). As an example, when the value of the state parameter is 0x6, the possible operation is that described in relation with FIG. 3 (RNG→PKA). As an example, when the value of the state parameter is equal to 0x8, the possible operation is that described in relation with FIG. 4A (PKA→AES). As an example, when the state parameter is equal to 0xA or 0x4, no chaining and coupling operation is possible. Processor 104 then for example has, when the value of the state parameter is equal to 0x4, the authorization to write into circuit 122, but no operation, neither of coupling, nor of chaining, will be performed by coupling and chaining circuit 112 as a response to this writing.

A column 708 (END) for example indicates a parameterizing of coupling and chaining circuit 112 indicating the end of an operation. As an example, each time a value indicating the end of an operation is stored, the state parameter is reprogrammed, or incremented, to a new value of the state parameter. The reprogramming, or the incrementation, of the value of the state parameter, is for example executed by the state machine. In particular, the state machine is configured to reprogram or increment the value of the state parameter when a final condition is verified. As an example, the final condition corresponds to the writing of value 0x3, for example into circuit 116 and according to the example described in relation with column 704. The writing of this value is, for example, triggered by processor 104 or by another hardware circuit of circuit 102. In particular, processor 104 is not authorized to modify the state value. However, when the value of the state parameter is equal to value 0xA, processor 104 for example programs a value indicating the end of an operation. As an example, the programming of this value, by processor 104, causes the returning of coupling and chaining circuit 112 to the legacy mode.

A column 710 (CPU ACTION) indicates, for example, the actions that can be performed by processor 104 according to the value of the state parameter.

As an example, when the state parameter has value 0x6, processor 104 may transmit requests for writing into circuit 122 (WRITE IN PKA). Column 706 then indicates that the operation described in relation with FIG. 3 has been performed. In this example, keys generated by number generator circuit 120 are written into the volatile memory of circuit 122.

As an example, a value RNGOKF SET is stored when a number of keys determined upstream has been written into the memory of circuit 122. In another example, value RNGOKF SET is stored when the memory of circuit 122 is full. As an example, the storage of value RNGOKF SET generates the programming, or the incrementation, of the state parameter to value 0x8.

As an example, when the value of the state parameter is equal to 0x4, the state machine is, for example, configured to verify the content of the volatile memory of circuit 122. As an example, the state machine verifies that all the data transmitted by processor 104, have been written into the volatile memory of circuit 122. As an example, once the verification of the memory has been successfully performed, a data value DATAOKF SET is stored in coupling and chaining circuit 112.

As an example, when the state of the state machine is value 0x4, processor 104 writes a private key into circuit 122. As an example, the write sequence for the write operation depends on the value of the state parameter stored in register 216.

As an example, the storage of value DATAOKF SET generates the reprogramming, or the incrementation, of the value of the state parameter to value 0x8.

When the value of the state parameter is equal to 0x8, processor 104 may, for example, transmit write and/or read requests to circuit 122 (READ/WRITE IN PKA). Column 706 indicates that the operation performed by coupling and chaining circuit 112 then is, for example, the operation described in relation with FIG. 4A. As an example, once the requests transmitted by processor 104 have been processed, a value GCMPH=0x3 is stored. As an example, processor 104 is configured to indicate to coupling and chaining circuit 112 that the access request sequence for reading from circuit 122 has ended. As an example, this indication takes the form of an access request for the writing of a data value, the data value being, for example, known by the state machine and indicating that the read and/or write sequence has ended.

The storage of value GCMPH=0x3 generates the reprogramming, or the incrementation, of the value of the state parameter to value 0xA. The operating mode of circuit 116 is then also modified.

When the value of the state parameter is equal to 0xA, coupling and chaining circuit 112 is configured to receive access requests for the reading of data from circuit 116 (READ IN AES) originating from processor 104. Processor 104 further reads, from peripheral circuit 116, the reference value generated via the binary object. Coupling and chaining circuit 112 is then configured to perform no operation (N/A). Once the reading from circuit 116 has ended, a value IPRST is, for example, stored in coupling and chaining circuit 112. The storage of value IPRST generates, for example, the reprogramming of the state parameter to the initial value. As an example, peripheral circuits 116, 118, and 122 are reset (RESET). In particular, the content, such as, for example, encryption keys, of the one or a plurality among circuits 122, 116, and 118, is removed. Although the example of FIG. 7 is based on specific values, these values are given as an example only, and could be changed into other values in other embodiments.

Figure 8:
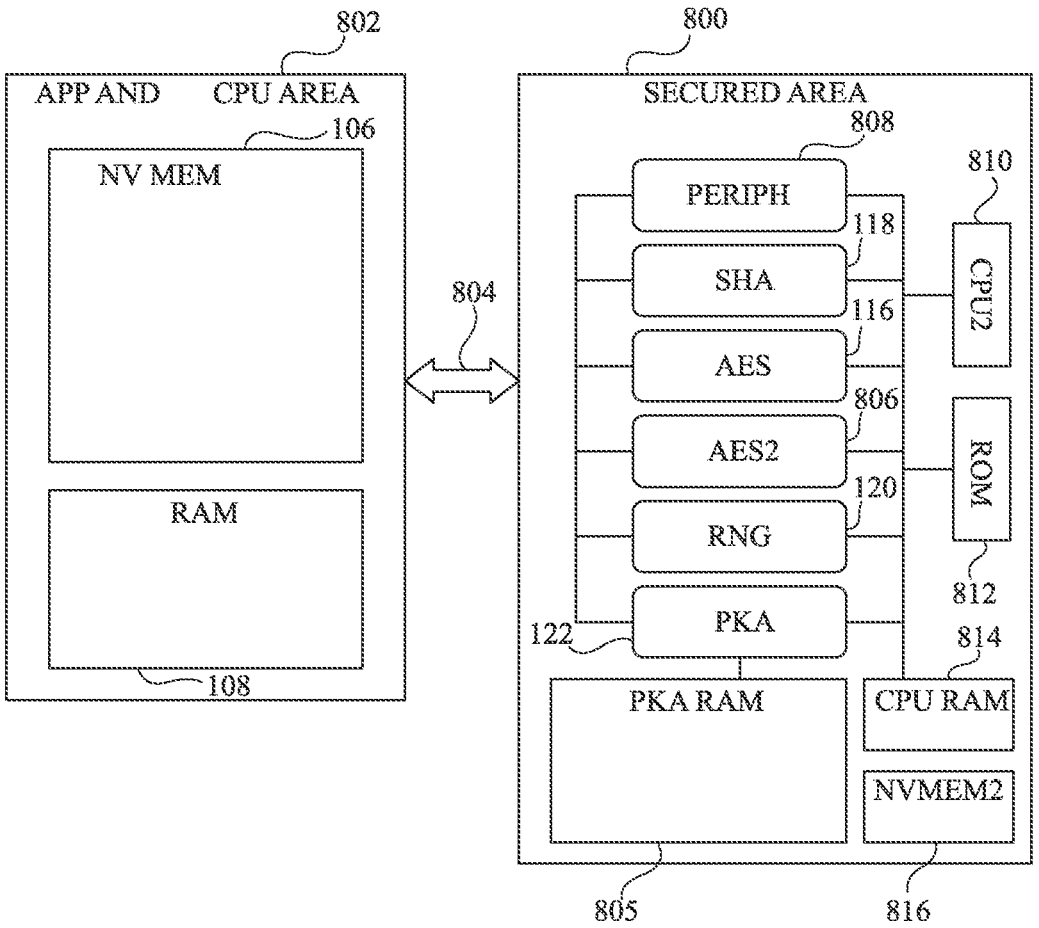
FIG. 8 is a block diagram illustrating another embodiment of an electronic device.

FIG. 8 is a block diagram illustrating another embodiment of electronic device 100.

As an example, circuit 102 comprises a secured area 800 (SECURED AREA) coupled to a non-secured area 802 (APP. AND CPU AREA) via a bus 804.

As an example, secured area 800 comprises circuits 116, 118, 120, and 122 as well as coupling and chaining circuit 112. As an example, circuit 122 is coupled to a volatile memory 805 (PKA RAM) configured to store data transmitted by coupling and chaining circuit 112.

Secured area 800 further comprises, for example, another cryptographic circuit 806 (AES2), for example configured to encrypt and/or decrypt data according to a cryptographic algorithm, such as, for example, an AES-type algorithm.

As an example, secured area 800 further comprises other peripheral circuits 808, such as for example a cyclic redundancy check circuit.

As an example, secured area 800 further comprises a dedicated processor 810 (CPU2) coupled to coupling and chaining circuit 112 via a bus. Area 800 further comprises, for example, a read-only non-volatile memory 812 (ROM) as well as a volatile memory 814 (CPU RAM) and a non-volatile memory 816 (NV MEM2). Dedicated processor 802 is configured to perform the coupling and/or chaining operations via coupling and chaining circuit 112. According to this embodiment, only processor 810 is configured to perform secure operations, and accordingly, to manipulate the generated binary objects.

As an example, non-secured area 802 comprises processor 104, as well as non-volatile and volatile memories 106 and 108.

An advantage of the described embodiments is that processor 104 cannot read the plain data and cannot make a transaction with coupling and chaining circuit 112.

Another advantage of the described embodiments is that dedicated processor 810, although it can use coupling and chaining circuit 112, cannot read plain data either. The use of processor 810 provides an additional isolation level to the critical data and to the secrets.

Another advantage of the described embodiments, comprising the combination, at the system level, of the peripheral circuits with a chaining or coupling circuit, is that they enable to improve the performance in terms of processing time and/or to provide new functionalities without modifying existing peripherals. The peripheral circuits, such as for example a cryptographic circuit and a cyclic redundancy check circuit, or any other peripheral circuit, have the possibility of being used separately or in combined fashion according to the mode of use of the coupling and chaining circuit.

Another advantage of the described embodiments is that they enable to perform the processing of the data value by two peripheral circuits in parallel. The use of the circuit coupling and chaining enables to decrease the surface area of the circuit. A chaining operation requires a single data transfer request from processor 104. Thus, the described embodiments enable to improve the performance, in terms of processing time, of the device, and to decrease its energy consumption.

Another advantage of the described embodiments is that, as compared with the use of the processor only, with no coupling and chaining circuit, fewer operations are necessary to perform a chaining or coupling operation between two peripherals. Indeed, a single access request originating from the processor enables the generation, by coupling and chaining circuit, of other operations.

An advantage of the embodiments described in relation with FIGS. 3, 4A, 4B, 5A, and 5B is that neither processor 104, nor processor 810, ever manipulates plain data. Processor 104 can only directly use the peripherals when the coupling and chaining circuit is in legacy mode.

Various embodiments and variants have been described. Those skilled in the art will understand that certain features of these various embodiments and variants may be combined, and other variants will occur to those skilled in the art. In particular, the type of operation performed according to the value of the state parameter may vary. Although the illustrated examples describe the processing of encryption keys, other types of data processing may be implemented. The values capable of being taken by the state parameter may of course differ from the described values, in particular with the values described in relation with FIG. 7. Similarly, the type of operations performed by the coupling and chaining circuit and the implied peripheral circuits may differ from the operations for example described in FIGS. 3, 4A, 4B, 5A, and/or 5B.

Finally, the practical implementation of the described embodiments and variants is within the abilities of those skilled in the art based on the functional indications given hereabove. In particular, although the described peripheral circuits are mainly cryptographic circuits, other types of circuits may be coupled to the coupling and chaining circuit.

The invention claimed is:

1. An interface circuit, comprising:
a first coupling to a first peripheral circuit;
a second coupling to a second peripheral circuit;
a register storing a state parameter; and
wherein the interface circuit is configured to:
   receive an access request for write or read that originates from a processor, said access request including a data value and a destination address; and
   generate a sequence of access operations for write and/or read at the first and second peripheral circuits, the access operations being selected according to a value of the state parameter and wherein an address in one of the first and second peripheral circuits for access operation is specified by the data value of the access request and wherein an address in the other of the first and second peripheral circuits for access operation is specified by the destination address of the access request.

2. The interface circuit according to claim 1, wherein the value of the state parameter, the data value and the destination address specify that the access operation is for writing data generated from the address in the second peripheral circuit to the address in the first peripheral circuit.

3. The interface circuit according to claim 1, wherein the value of the state parameter, the data value and the destination address specify that the access operation is for reading data stored at the address in the first peripheral circuit and writing that data to the address in the second peripheral circuit.

4. The interface circuit according to claim 1, wherein the access operation comprises:
   writing data, generated by the second peripheral circuit, to the address in the first peripheral circuit; or
   reading data stored at the address in the first peripheral circuit and writing the data to the address in the second peripheral circuit,
   wherein a nature of the access operation is selected as a function of the value of the state parameter written in the register and the destination address.

5. The interface circuit according to claim 1, wherein the access operation comprises:
   writing data generated by the second peripheral circuit, at the address in the first peripheral circuit, when the access request is an access request for writing a the data value in the first peripheral circuit and when the state parameter is programmed to a first state value; and
   reading data stored in the first peripheral at the address and writing the data in the second peripheral circuit when the state parameter is programmed to a second state value, different from the first state value.

6. The interface circuit according to claim 1, wherein, when the access request is an access request for writing of data, the interface circuit is further configured to select the access operation and/or the destination of the access operation according to the data value.

7. The interface circuit according to claim 1, wherein, when the access request is an access request for the writing of one of a first data or a second data that is different from the first data, into the first peripheral circuit and when the state parameter is programmed to a first state parameter value, the generated access operation comprises writing another data value, generated by the second peripheral circuit, at the address in the first peripheral circuit.

8. The interface circuit according to claim 7, wherein, when the state parameter is programmed to a second state parameter value different from the first state parameter value, the access operation comprises reading data from the first peripheral circuit stored at the address and writing that data value into the second peripheral circuit.

9. The interface circuit according to claim 1, further configured, when the state parameter is programmed to a set value, to authorize access, by the processor, to each of the first and second peripheral circuits.

10. The interface circuit according to claim 9, wherein, when the access request is an access request for writing a forbidden data value, the generated access operation comprises programming of the value of the state parameter to the set value and removal of content from at least one of the first and second peripheral circuits.

11. The interface circuit according to claim 1, wherein the generated access operation further comprises reading from and/or writing into a third peripheral circuit coupled to the interface circuit.

12. The interface circuit according to claim 1, further configured, in response to the access request for read or write originating from the processor, to return a default value to the processor.

13. The interface circuit according to claim 1, wherein when the state parameter has a first value, the access request is a request for writing of data generated by the second peripheral circuit to the address in the first peripheral circuit, and wherein when the state parameter has a second value, the access request is a request for reading data from the address in the first peripheral circuit and writing the read data to the second peripheral circuit.

14. An electronic device, comprising:
   the interface circuit according to claim 1; and
   the first and second peripheral circuits coupled to the interface circuit; and
   the processor coupled to the interface circuit and configured to transmit the access request directed towards the interface circuit.

15. The device according to claim 14, wherein the first and second peripheral circuits comprise a first cryptographic circuit and a number generator, respectively, and wherein the interface circuit is configured to, when the state parameter is programmed to a first state value, intercept an access request for writing an encryption key originating from the processor and towards the first cryptographic circuit and control the writing of another value, generated by the number generator, at the address in the first cryptographic circuit.

16. The device according to claim 15, further comprising a second cryptographic circuit coupled to the interface circuit, and wherein the interface circuit is configured to, when the state parameter is programmed to a second state value different from the first state value, intercept an access request originating from the processor and directed toward the first cryptographic circuit and control the writing of a data value, previously stored at in the first cryptographic circuit, into the second cryptographic circuit.

17. The device according to claim 14, further comprising a clock reset circuit configured to activate and/or deactivate the first and second peripheral circuits and wherein the interface circuit is configured to control the clock reset circuit.

18. A method, comprising:

receiving, by an interface circuit, an access request for write or read originating from a processor, said access request including a data value and a destination address; and generating, by the interface circuit, a sequence of access operations for write and/or read at a the first peripheral circuit and a second peripheral circuit coupled to the interface circuit, the access operations being selected according to a value of a state parameter stored in a register of the interface circuit and wherein an address in one of the first and second peripheral circuits for access operation is specified by the data value of the access request and wherein an address in the other of the first and second peripheral circuits for access operation is specified by the destination address of the access request.

19. The method according to claim 18, wherein the value of the state parameter, the data value and the destination address specify that the access operation is for writing data generated from the address in the second peripheral circuit to the address in the first peripheral circuit.

20. The method according to claim 18, wherein the value of the state parameter, the data value and the destination address specify that the access operation is for reading data stored at the address in the first peripheral circuit and writing that data to the address in the second peripheral circuit.

21. The method according to claim 18, wherein, when the access request is an access request for writing of data, the generated access operation and/or the destination of the access operation are further selected according to the data value.

22. The method according to claim 18, further comprising delivering, by the interface circuit and towards the processor, a default value as a response to the access request.

23. The method according to claim 18, wherein, when the access request is an access request for the writing of one of a first data value or a second data value that is different from the first data, into the first peripheral circuit and when the state parameter is programmed to a first state parameter value, the generated access operation comprises writing another data value, generated by the second peripheral circuit, at the address in the first peripheral circuit.

24. The method according to claim 23, wherein, when the state parameter is programmed to a second state parameter value different from the first state parameter value, the access operation comprises reading data from the first peripheral circuit stored at the address and writing that data value into the second peripheral circuit.

25. The method according to claim 23, further comprising, when the state parameter is programmed to a set value, authorizing access, by the processor, to each of the first and second peripheral circuits.

26. The method according to claim 25, wherein, when the access request is an access request for writing a forbidden data value, the generated access operation comprises programming of the value of the state parameter to the set value and removing content from at least one of the first and second peripheral circuits.

27. The method according to claim 18, further comprising, in response to the access request for read or write originating from the processor, returning a default value to the processor.

28. The method according to claim 18, wherein when the state parameter has a first value, the access request is a request for writing of data generated by the second peripheral circuit to the address in the first peripheral circuit, and wherein when the state parameter has a second value, the access request is a request for reading data from the address in the first peripheral circuit and writing the read data to the second peripheral circuit.

* * * * *